(12) United States Patent
Frauens

(10) Patent No.: US 10,105,902 B2
(45) Date of Patent: Oct. 23, 2018

(54) ELECTROPHOTOGRAPHY-BASED ADDITIVE MANUFACTURING WITH PART MOLDING

(71) Applicant: Evolve Additive Solutions, Inc., Minnetonka, MN (US)

(72) Inventor: Michael Frauens, Webster, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 0 days.

(21) Appl. No.: 15/490,491

(22) Filed: Apr. 18, 2017

(65) Prior Publication Data

US 2017/0299973 A1    Oct. 19, 2017

Related U.S. Application Data

(60) Provisional application No. 62/324,100, filed on Apr. 18, 2016.

(51) Int. Cl.
| | |
|---|---|
| *B29C 67/00* | (2017.01) |
| *B33Y 10/00* | (2015.01) |
| *B33Y 30/00* | (2015.01) |
| *G03G 15/00* | (2006.01) |
| *B29C 64/141* | (2017.01) |

(Continued)

(52) U.S. Cl.
CPC ........ *B29C 67/0074* (2013.01); *B29C 64/141* (2017.08); *B29C 64/188* (2017.08); *B29C 70/74* (2013.01); *B33Y 10/00* (2014.12); *B33Y 30/00* (2014.12); *G03G 15/00* (2013.01); *G03G 15/225* (2013.01); *B29C 64/106* (2017.08); *B29C 64/118* (2017.08); *B29C 64/147* (2017.08); *B29C 64/153* (2017.08); *B29C 64/20* (2017.08); *B29C 64/264* (2017.08); *B29C 64/268* (2017.08)

(58) Field of Classification Search
CPC ......... B33Y 10/00; B33Y 30/00; B29C 64/20; B29C 64/264; B29C 64/268; B29C 64/106; B29C 64/118; B29C 64/141; B29C 64/147; B29C 64/153; B29C 67/0051; B29C 67/0092; B29C 67/0074; B22F 3/008; G03G 15/14; G03G 15/224; B29K 2105/251

USPC ..... 425/174.4, 375; 264/440, 225, 219, 250, 264/259, 308; 399/320, 336

See application file for complete search history.

(56) References Cited

U.S. PATENT DOCUMENTS

| | | | |
|---|---|---|---|
| 7,236,166 B2 * | 6/2007 | Zinniel | B33Y 30/00 64/340 |
| 8,488,994 B2 | 7/2013 | Hanson et al. | |

(Continued)

*Primary Examiner* — Seyed Masoud Malekzadeh
*Assistant Examiner* — Lawrence D. Hohenbrink, Jr.
(74) *Attorney, Agent, or Firm* — Peter J. Ims; Westman, Champlin & Koehler, P.A.

(57) ABSTRACT

An additive manufacturing method produces a 3D part utilizes electrophotography-based additive manufacturing and molding processes. A layered structure having a cavity is printed on a build platform using at least one electrophotographic (EP) engine to develop imaged layers of powder material, and a transfusion assembly to stack and fuse the imaged layers on the build platform. Molding material is deposited into the cavity as the layered structure is printed, using a deposition unit. The molding material solidifies to form at least a portion of the 3D part, which may also include portions formed from imaged powder material.

11 Claims, 8 Drawing Sheets

(51) Int. Cl.
*B29C 70/74* (2006.01)
*G03G 15/22* (2006.01)
*B29C 64/188* (2017.01)
*B29C 64/264* (2017.01)
*B29C 64/118* (2017.01)
*B29C 64/147* (2017.01)
*B29C 64/153* (2017.01)
*B29C 64/20* (2017.01)
*B29C 64/268* (2017.01)
*B29C 64/106* (2017.01)

(56) References Cited

U.S. PATENT DOCUMENTS

| | | |
|---|---|---|
| 8,718,522 B2 | 5/2014 | Chillscyzn et al. |
| 8,879,957 B2 | 11/2014 | Hanson et al. |
| 2002/0145213 A1* | 10/2002 | Liu ................ G03G 15/224 264/40.1 |
| 2010/0021638 A1* | 1/2010 | Varanka ............ B33Y 10/00 427/271 |
| 2013/0186549 A1 | 7/2013 | Comb et al. |
| 2013/0186558 A1 | 7/2013 | Comb et al. |
| 2015/0024169 A1* | 1/2015 | Martin ............ B29C 67/0092 428/172 |

\* cited by examiner

ELECTROPHOTOGRAPHY-BASED ADDITIVE MANUFACTURING WITH PART MOLDING

BACKGROUND

The present disclosure relates to systems and methods for manufacturing 3D parts through a combination of electrophotography-based additive manufacturing processes and molding processes.

Additive manufacturing is generally a process in which a three-dimensional (3D) object is manufactured utilizing a computer model of the objects. A basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In an electrophotographic 3D printing or production process, each slice of the digital representation of the 3D part is printed or developed from powder materials using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the charged powder is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

In fabricating 3D parts by depositing layers of a part material, supporting layers or structures are typically built underneath overhanging portions or in cavities of objects under construction, which are not supported by the part material itself. The support structure is typically built utilizing the same deposition techniques by which the part material is deposited. The support material adheres to the part material during fabrication, and is removable from the completed 3D part when the printing process is complete.

SUMMARY

Aspects of the present disclosure are directed to systems and methods for manufacturing 3D parts through a combination of electrophotography-based additive manufacturing processes and molding processes. In some embodiments of the method of producing a 3D part using electrophotography-based additive manufacturing and molding processes, a mold structure is built or printed having a cavity on a build platform using at least one electrophotographic (EP) engine and a transfusion assembly. Molding material is then deposited into the cavity using a deposition unit to form the 3D part.

One embodiment of an additive manufacturing system for producing 3D parts includes an electrophotographic engine and a deposition unit. The electrophotography unit includes a transfer assembly including a transfer medium, at least one EP engine configured to develop layers of a powder material, and a transfusion assembly configured to build a mold structure having a cavity on a build platform in a layer-by-layer manner by transfusing the developed layers to each other. The deposition unit is configured to deposit molding material into the cavity and form a molded part portion of the 3D part within the cavity.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

As mentioned above, during a electrophotographic 3D part additive manufacturing or printing operation, an electrophotographic (EP) engine may develop each layer of the 3D part (part portions) and associated support structures (support structure portions) out of powder materials (e.g., polymeric toners) using the electrophotographic process. The developed layers are then transferred to a transfer medium, which delivers the layers to a transfusion assembly where the layers are transfused together (e.g., using heat and/or pressure) to build the 3D part and support structures in a layer-by-layer manner. The support structures are later removed (e.g., dissolved) to reveal the completed 3D part.

Electrophotography is sensitive to numerous characteristics of the powder material used to form the part and support portions. These include the charge-to-mass ratio (Q/M), size, surface, morphology, roundness, flow, and infrared absorption. Additionally, the support structure material must be compatible with the part material (including, for example, the pressures and temperatures at which the part material fuses), while also being removable after the part is built (for example, soluble in a solution that will not affect the part material). The materials for use in electrophotographic part building processes must be precisely matched for use with the hardware components of the electrophotography-based additive manufacturing system. As a result of the numerous variables, the selection of materials available for forming 3D parts using the electrophotographic process are limited, or additional cost is necessary in their creation.

Embodiments of the present disclosure are a hybrid system that utilizes the electrophotographic manufacturing process to print or build a mold structure in a layer-by-layer manner in coordination with using a non-electrophotographic process to produce a 3D part, or a molded portion of a 3D part, within the mold structure. This allows for manufacturing of parts out of materials that are not compatible with the electrophotographic manufacturing process used to build the support structure. Additionally, this gives flexibility to sharp melting point materials (crystalline materials) that may have less latitude in pressure settings relative to the support material.

Figure 1:
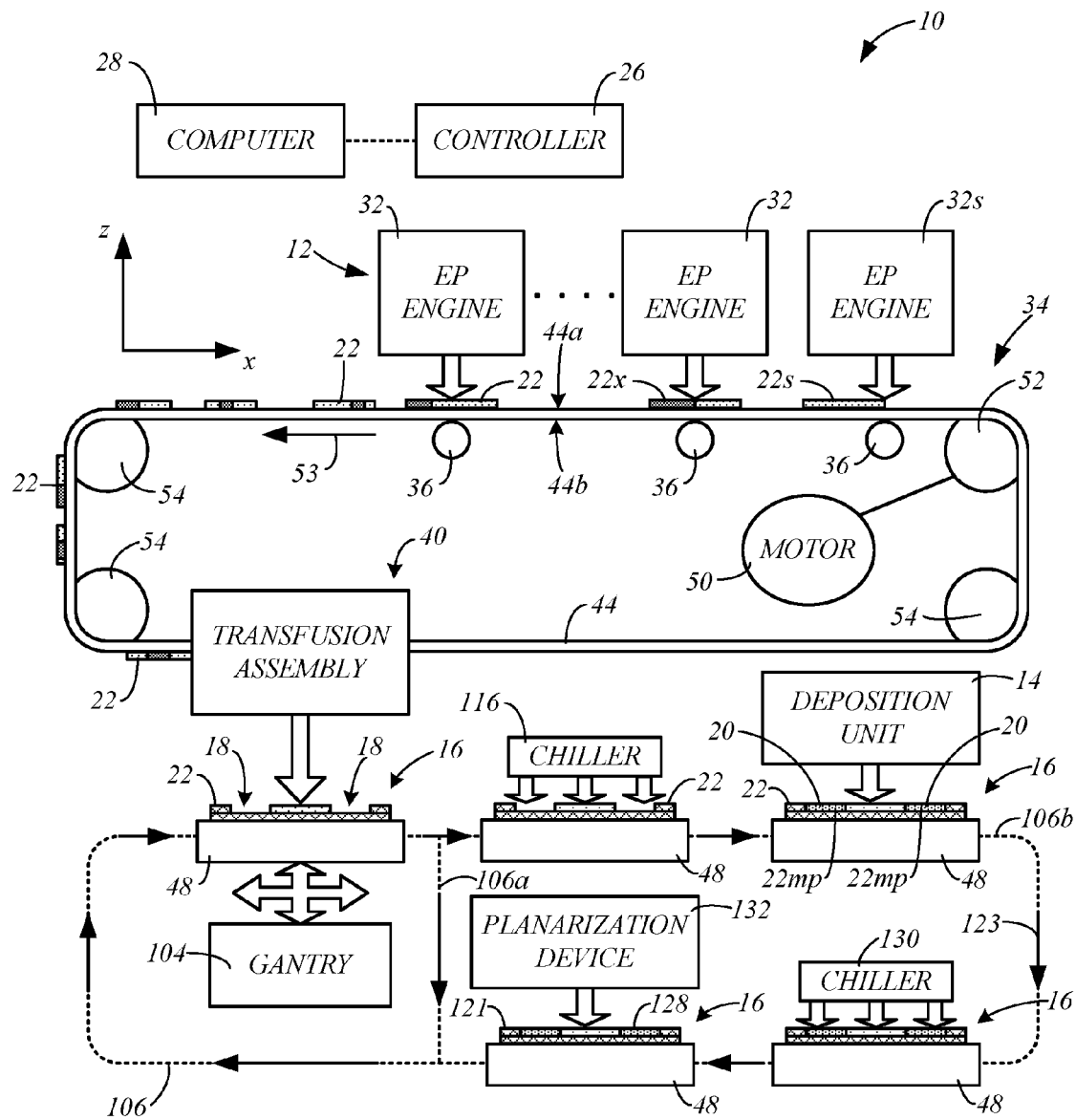
FIG. 1 is a simplified diagram of an exemplary additive manufacturing system for producing 3D parts and associated support structures, in accordance with embodiments of the present disclosure.

FIG. 1 is a simplified diagram of an exemplary additive manufacturing system 10 for producing 3D parts and associated support structures using electrophotographic and molding processes. System 10 includes an electrophotography-based additive manufacturing unit (EP unit) 12 and a deposition unit 14. The EP unit 12 provides imaged powder layers of toner material that undergo a transfusion process in order to build EP layers of a combined structure 16 having a cavity 18 that defines a part mold. The deposition unit 14 forms a molded part portion of the structure 16 by depositing molding material 20 into the cavity 18.

As discussed in greater detail below, these EP structure building and molding processes may be performed on a layer-by-layer basis to form the final 3D part. That is, the EP unit 12 may form at least one layer, generally referred to as EP layer 22, of the structure 16 that defines a portion of the desired cavity or part mold 18. The deposition unit 14 is then used to apply the molding material 20 into the cavity 18 to form the molded part portion. Additional EP layers 22 may then be formed over the previously built EP layers 22 and the molded part portions that define another portion of the desired cavity or part mold 18 using the EP unit 12. The deposition unit 14 may then deposit molding material 20 into the new cavity 18 to form another layer of the molded part. The deposited layers of molding material 20 may be courser than the EP layers 22, and they may be deposited only after several EP layers 22 are transfused to form a mold cavity. These steps may be repeated as necessary until the structure 16 is completely formed. Afterward, portions of the electrophotographically built structure 16 may be removed by, for example, dissolving or disintegrating sacrificial material portions of the structure 16 in an aqueous solution or dispersion, to complete the production of a final produced 3D part that includes the molded part. In some embodiments, the EP layers 22 of the EP printed structure 16 may include printed part portions along with sacrificial portions, wherein the printed part portions are combined with the molded part portions to form the final produced 3D part.

In some embodiments, the system 10 includes a controller 26, which represents one or more processors that are configured to execute instructions, which may be stored locally in memory of the system 10 or in memory that is remote to the system 10, to control components of the system 10 to perform one or more functions described herein. In some embodiments, the controller 26 includes one or more control circuits, microprocessor-based engine control systems, and/or digitally-controlled raster imaging processor systems, and is configured to operate the components of system 10 in a synchronized manner based on printing instructions received from a host computer 28 or a remote location. In some embodiments, the host computer 28 includes one or more computer-based systems that are configured to communicate with controller 26 to provide 3D part printing instructions (and other operating information). For example, the host computer 28 may transfer information to the controller 26 that relates to the sliced layers of the 3D parts and support structures, thereby allowing the system 10 to produce the 3D parts and support structures in a layer-by-layer manner.

Exemplary embodiments of the EP unit 12 will initially be described with reference to FIGS. 1-4. In some embodiments, the EP unit 12 includes one or more EP engines, generally referred to as 32, a transfer assembly 34, biasing mechanisms 36, and a transfusion assembly 40, as shown in FIG. 1. Examples of suitable components and functional operations for the EP unit 12 include those disclosed in Hanson et al., U.S. Pat. Nos. 8,879,957 and 8,488,994.

The EP engines 32 image or otherwise develop the layers 22 of powder materials, where the powder materials are each preferably engineered for use with the particular architecture of each of the EP engines 32. As discussed below, the developed EP layers 22 may be transferred to a transfer medium 44 of the transfer assembly 34, which delivers the layers 22 to the transfusion assembly 40. The transfusion assembly 40 operates to build or print the 3D structure 16, which may include support structures, part structures that form a portion of the 3D part being produced, and/or other structures, in a layer-by-layer manner by transfusing the layers 22 together on a build platform 48.

In some embodiments, the transfer medium 44 includes a belt, as shown in FIG. 1. Examples of suitable transfer belts for the transfer medium 44 include those disclosed in Comb et al. U.S. Publication Nos. 2013/0186549 and 2013/0186558. In some embodiments, the belt 44 includes front surface 44a and rear surface 44b, where front surface 44a faces the EP engines 12, and the rear surface 44b is in contact with the biasing mechanisms 36.

In some embodiments, the transfer assembly 34 includes one or more drive mechanisms that include, for example, a motor 50 and a drive roller 52, or other suitable drive mechanism, and operate to drive the transfer medium or belt 44 in a feed direction 53. In some embodiments, the transfer assembly 34 includes idler rollers 54 that provide support for the belt 44. The exemplary transfer assembly 34 illustrated in FIG. 1 is highly simplified and may take on other configurations. Additionally, the transfer assembly 34 may include additional components that are not shown in order to simplify the illustration, such as, for example, components for maintaining a desired tension in the belt 44, a belt cleaner for removing debris from the surface 44a that receives the layers 22, and other components.

The EP unit 12 includes at least one EP engine 32s that develops layers of powder support material. In some embodiments, the one or more EP engines 32 shown in FIG. 1 may include one or more EP engines 32 that develop layers of powder part material, and are generally referred to herein as EP engines 32p. In some embodiments, the EP engine 32s is positioned upstream from a corresponding EP engine 32p relative to the feed direction 53, as shown in FIG. 1. In alternative embodiments, the arrangement of the EP engines 32p and 32s may be reversed such that the EP engine 32p is upstream from the EP engine 32s relative to the feed direction 53. In further alternative embodiments, EP unit 12 may include three or more EP engines 32 for printing layers of additional materials, as indicated in FIG. 1, or it may include only EP engine 32s.

Figure 2:
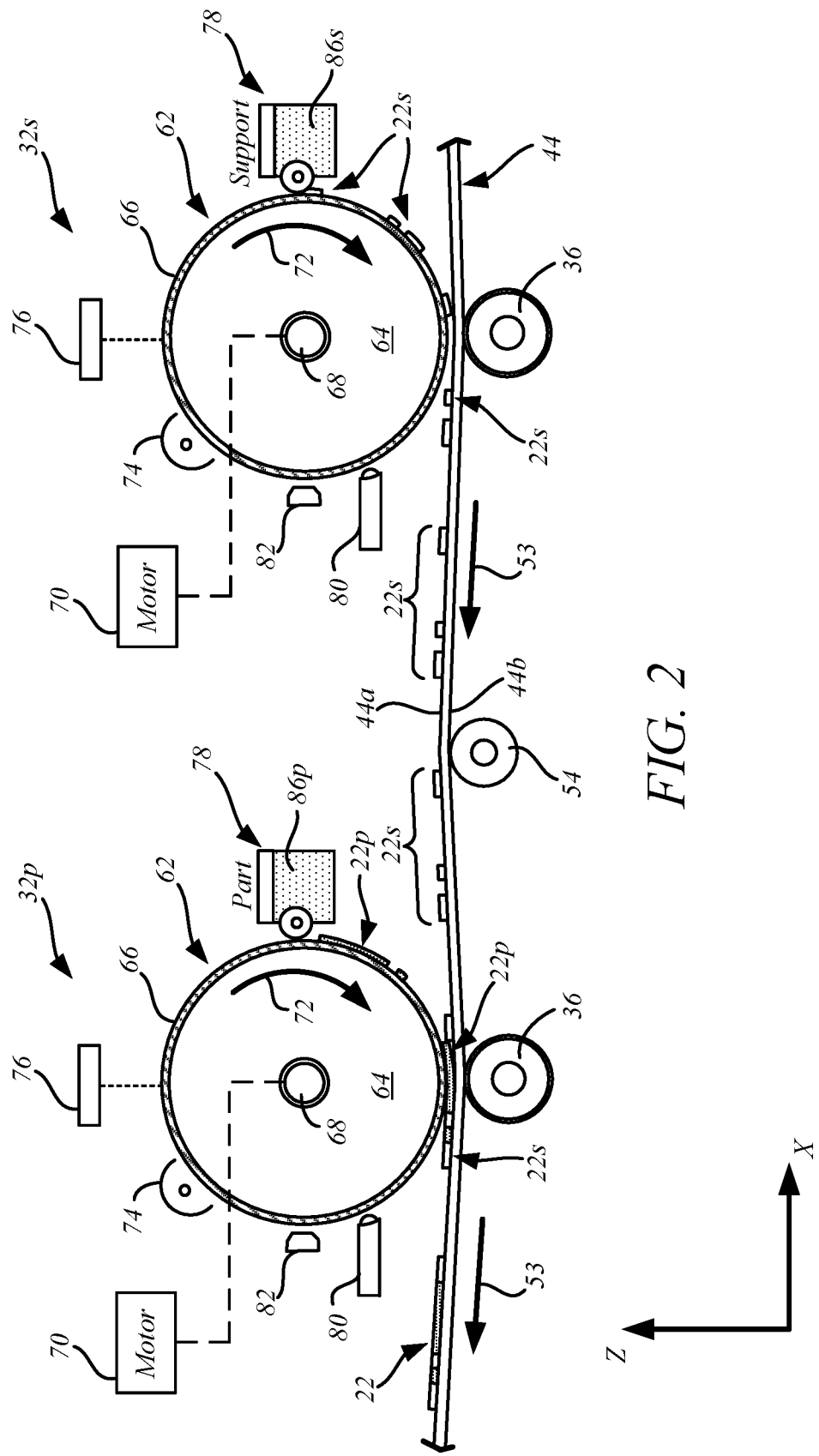
FIG. 2 is a schematic view of an exemplary electrophotographic engine of the system for developing layers of the support material.

FIG. 2 is a schematic front view of the EP engines 32s and 32p of the EP unit 12, in accordance with exemplary embodiments of the present disclosure. In the shown embodiment, the EP engines 32p and 32s may include the same components, such as a photoconductor drum 62 having a conductive body 64 and a photoconductive surface 66. The conductive body 64 is an electrically-conductive body (e.g., fabricated from copper, aluminum, tin, or the like), that is electrically grounded and configured to rotate around a shaft 68. The shaft 68 is correspondingly connected to a drive motor 70, which is configured to rotate the shaft 68 (and the photoconductor drum 62) in the direction of arrow 72 at a constant rate. While embodiments of the EP engines 32 are discussed and illustrated as utilizing a photoconductor drum 62, a belt having a conductive material, or other suitable bodies, may also be utilized in place of the photoconductor drum 62 and the conductive body 64.

The photoconductive surface 66 is a thin film extending around the circumferential surface of the conductive body 64, and is preferably derived from one or more photoconductive materials, such as amorphous silicon, selenium, zinc oxide, organic materials, and the like. As discussed below, the surface 66 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the exemplary EP engines 32p and 32s also includes a charge inducer 74, an imager 76, a development station 78, a cleaning station 80, and a discharge device 82, each of which may be in signal communication with the controller 26. The charge inducer 74, the imager 76, the development station 78, the cleaning station 80, and the discharge device 82 accordingly define an image-forming assembly for the surface 66 while the drive motor 70 and the shaft 68 rotate the photoconductor drum 62 in the direction 72.

The EP engines 32 use the charged particle or powder material(s) (e.g., polymeric or thermoplastic toner), generally referred to herein as 86, to develop or form the EP layers 22. For example, the image-forming assembly for the surface 66 of the EP engine 32s is used to form support layers 22s of the powder support material 86s, where a supply of the support material 86s may be retained by the development station 78 (of the EP engine 32s) along with carrier particles. Similarly, the image-forming assembly for the surface 66 of the EP engine 32p is used to form part layers 22p of the powder part material 86p, where a supply of the part material 86p may be retained by the development station 78 (of the EP engine 32p) along with carrier particles.

The charge inducer 74 is configured to generate a uniform electrostatic charge on the surface 66 as the surface 66 rotates in the direction 72 past the charge inducer 74. Suitable devices for the charge inducer 74 include corotrons, scorotrons, charging rollers, and other electrostatic charging devices.

The imager 76 is a digitally-controlled, pixel-wise light exposure apparatus configured to selectively emit electromagnetic radiation toward the uniform electrostatic charge on the surface 66 as the surface 66 rotates in the direction 72 the past imager 76. The selective exposure of the electromagnetic radiation to the surface 66 is directed by the controller 26, and causes discrete pixel-wise locations of the electrostatic charge to be removed (i.e., discharged, thereby forming latent image charge patterns on the surface 66.

Suitable devices for the imager 76 include scanning laser (e.g., gas or solid state lasers) light sources, light emitting diode (LED) array exposure devices, and other exposure device conventionally used in 2D electrophotography systems. In alternative embodiments, suitable devices for the charge inducer 74 and the imager 76 include ion-deposition systems configured to selectively directly deposit charged ions or electrons to the surface 66 to form the latent image charge pattern. As such, as used herein, the term "electrophotography" can broadly be considered as "electrostatography," or a process that produces a charge pattern on a surface. Alternatives also include such things as ionography.

Each development station 78 is an electrostatic and magnetic development station or cartridge that retains the supply of the powdered part material 86p or the support material 86s, along with carrier particles. The development stations 78 may function in a similar manner to single or dual component development systems and toner cartridges used in 2D electrophotography systems. For example, each development station 78 may include an enclosure for retaining the part material 86p or the support material 86s and carrier particles. When agitated, the carrier particles generate triboelectric charges to attract the powders of the part material 86*p* or the support material 86*s*, which charges the attracted powders to a desired sign and magnitude, as discussed below.

Each development station 78 may also include one or more devices for transferring the charged material to the surface 66, such as conveyors, fur brushes, paddle wheels, rollers, and/or magnetic brushes. For instance, as the surface 66 (containing the latent charged image) rotates from the imager 76 to the development station 78 in the direction 72, the support material 86*s* is attracted to the appropriately charged regions of the latent image on the surface 66, utilizing either charged area development or discharged area development (depending on the electrophotography mode being utilized). This creates successive layers 22*s* as the photoconductor drum 62 continues to rotate in the direction 72, where the successive layers 22*s* correspond to the successive sliced layers of the digital representation of the 3D part or support structure.

The successive layers 22*p* or 22*s* are then rotated with the surface 66 in the direction 72 to a transfer region in which layers 22*p* or 22*s* are successively transferred from the photoconductor drum 62 to the belt 44 or other transfer medium. While illustrated as an engagement between the photoconductor drum 62 and the belt 44, in some preferred embodiments, the EP engines 32*p* and 32*s* may also include intermediary transfer drums and/or belts, as discussed further below. In other embodiments, the photoconductive drum 62 may engage directly with a transfer drum of the transfusion assembly 40 (thus obviating the need for transfer assembly 34).

After a given layer 22*p* or 22*s* is transferred from the photoconductor drum 62 to the belt 44 (or an intermediary transfer drum or belt), as a drive motor 70 rotates the shaft 68 and the photoconductor drum 62 in the direction 72 such that the region of the surface 66 that previously held the layer 22*p* or 22*s* passes the cleaning station 80. The cleaning station 80 is a station configured to remove any residual, non-transferred portions of part or support material 86*p* or 86*s*. Suitable devices for the cleaning station 80 include blade cleaners, brush cleaners, electrostatic cleaners, vacuum-based cleaners, and combinations thereof.

After passing the cleaning station 80, the surface 66 continues to rotate in the direction 72 such that the cleaned regions of the surface 66 pass the discharge device 82 to remove any residual electrostatic charge on the surface 66, prior to starting the next cycle. Suitable devices for the discharge device 82 include optical systems, high-voltage alternating-current corotrons and/or scorotrons, one or more rotating dielectric rollers having conductive cores with applied high-voltage alternating-current, and combinations thereof.

The biasing mechanisms 36 are configured to induce electrical potentials through the belt 44 to electrostatically attract the layers 22*p* and 22*s* from the EP engines 32*p* and 32*s* to the belt 44. Because the layers 22*p* and 22*s* are each only a single layer increment in thickness at this point in the process, electrostatic attraction is suitable for transferring the layers 22*p* and 22*s* from the EP engines 32*p* and 32*s* to the belt 44.

The controller 26 preferably rotates the photoconductor drums 62 of the EP engines 32*p* and 32*s* at the same rotational rates that are synchronized with the line speed of the belt 44 and/or with any intermediary or alternative transfer drums or belts. This allows the EP unit 12 to develop and transfer the layers 22*p* and 22*s* in coordination with each other from separate developer images. In particular, as shown, each part layer 22*p* may be transferred to the belt 44 with proper registration with each support layer 22*s* to produce a combined part and support material layer, which is generally designated as EP layer 22.

As can be appreciated, some of the EP layers 22 transferred to the layer transfusion assembly 40 may only include support material 86*s* or may only include part material 86*p*, depending on the particular geometries of the structure 16 and layer slicing. This may eliminate the necessity of registering layers 22*s* or 22*p* printed using different engines 32. Furthermore, when the system 100 only includes or uses one EP engines 32*s* to print single-material EP layers 22, registering different portions of each layer 22 may be avoided.

Figure 3:
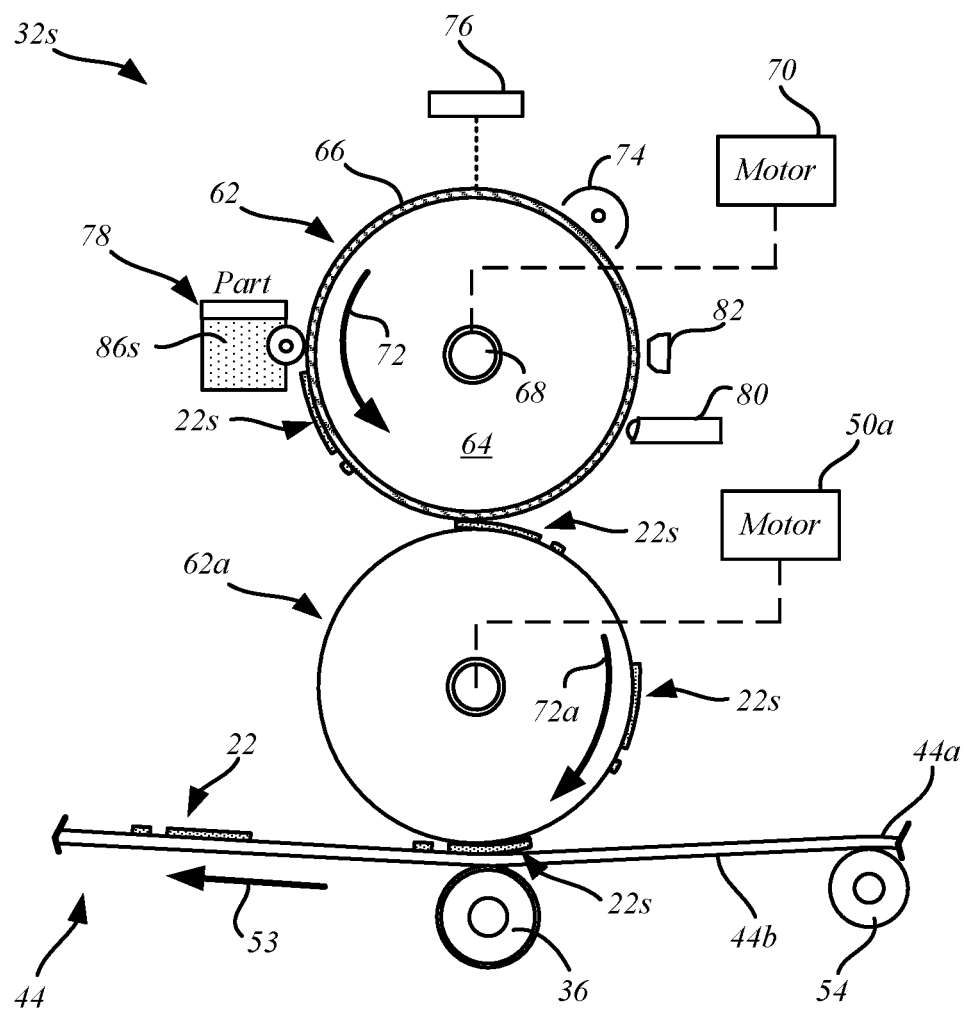
FIG. 3 is a schematic front view of an exemplary electrophotography engine, which includes an intermediary drum or belt.

In a further alternative embodiment, one or both of the EP engines 32*p* and 32*s* may also include one or more intermediary transfer drums and/or belts between the photoconductor drum 62 and the belt or transfer medium 44. For example, as shown in FIG. 3, the EP engine 32*s* may also include an intermediary drum 62*a* that rotates in the direction 72*a* that opposes the direction 72, in which drum 62 is rotated, under the rotational power of motor 70*a*. The intermediary drum 62*a* engages with the photoconductor drum 62 to receive the developed layers 22*s* from the photoconductor drum 62, and then carries the received developed layers 22*s* and transfers them to the belt 44. When present in the system 100, an EP engine 32*p* may include the same arrangement of an intermediary drum 62*a* for carrying the developed layers 22*p* from the photoconductor drum 62 to the belt 44. The use of such intermediary transfer drums or belts for the EP engines 32*p* and 32*s* can be beneficial for thermally isolating the photoconductor drum 62 from the belt 44, for example.

Figure 4:
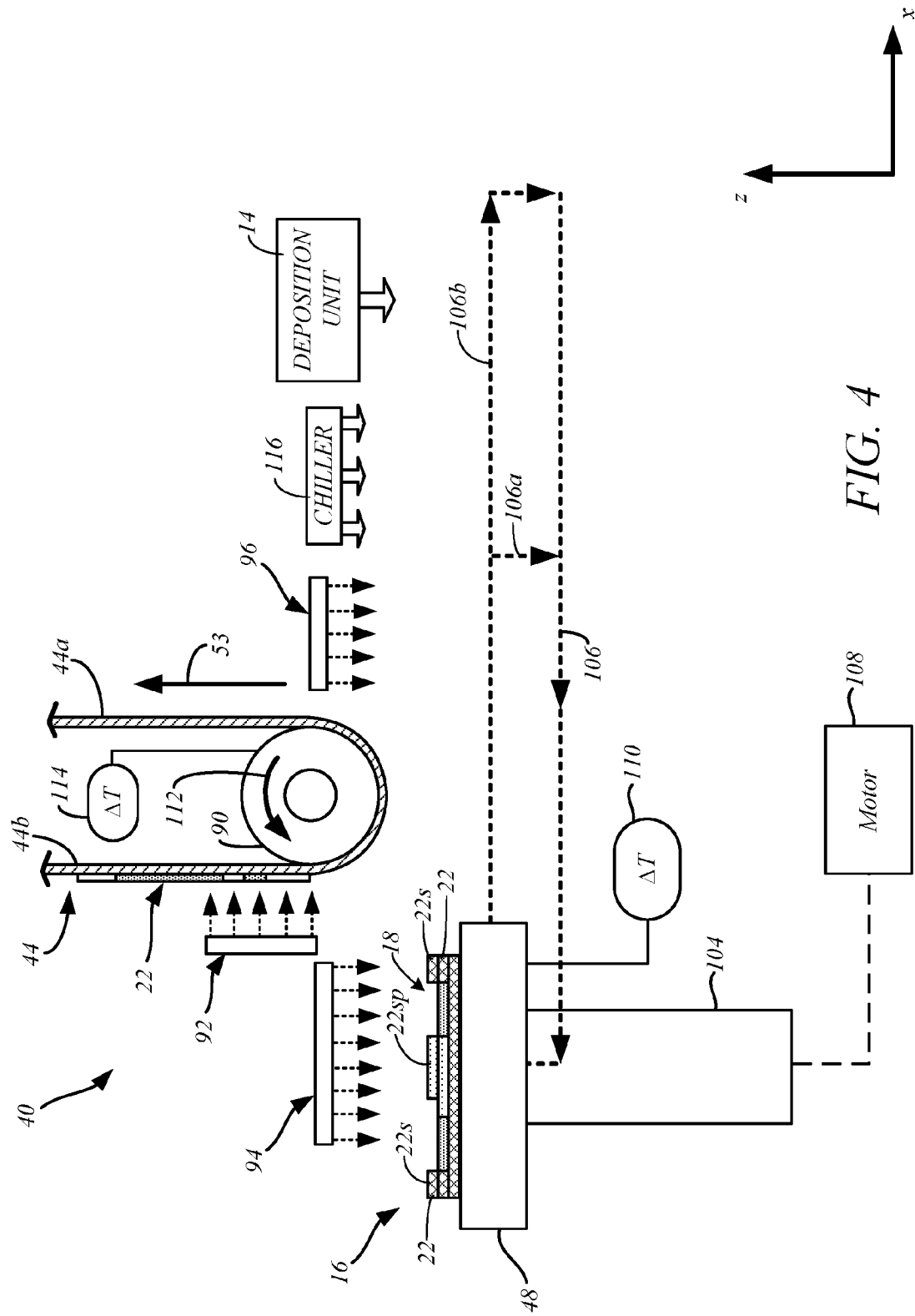
FIG. 4 is a schematic front view of an exemplary transfusion assembly of the system for performing layer transfusion steps with the developed layers.

FIG. 4 illustrates an exemplary embodiment for the layer transfusion assembly 40. As shown, the transfusion assembly 40 includes the build platform 48, a nip roller 90, a layer heater 92, top-of-part heater 94, and an optional post-transfusion heater 96. The build platform 48 is a platform assembly or platen of the EP unit 12 that is configured to receive the heated EP layers 22 for printing or building the structure 16, which may include part portions 22*p* of the 3D part, and/or support portions 22*s*, in a layer-by-layer manner. In some embodiments, the build platform 48 may include removable film substrates (not shown) for receiving the printed layers 22, where the removable film substrates may be restrained against build platform using any suitable technique (e.g., vacuum).

The structure 16 illustrated in FIG. 4 includes EP layers 22 having portions 22*sp*, that represent either support portions 22*s* or part portions 22*p*. Thus, the structure 16 illustrated in FIG. 4 represents a structure 16 that is formed entirely of support portions 22*s*, and a structure 16 that includes both support portions 22*s* and part portions 22*p*. Portions 22*sp* are also shown in other figures to illustrate these alternative options for the structure 16 and the individual layers 22 forming the structure 16.

The build platform 48 is supported by a gantry 104 or other suitable mechanism, which is configured to move the build platform 48 along a build path 106 that traverses the z-axis and the x-axis, as illustrated schematically in FIGS. 1 and 4. In some embodiments, the gantry 104 may move the platform 48 along the build path 106 in a reciprocating rectangular pattern where the primary motion is back-and-forth along the x-axis, as illustrated in FIG. 4. The gantry 104 may be operated by a motor 108 based on commands from the controller 26, where the motor 108 may be an electrical motor, a hydraulic system, a pneumatic system, or the like.

In some embodiments, the build platform 48 includes a heating element 110 (e.g., an electric heater), as illustrated in FIG. 4. The heating element 110 may be configured to heat and maintain the build platform 48 at an elevated temperature that is greater than room temperature (25° C.), such as at a desired average temperature of the structure 16, as discussed in Comb et al. U.S. Publication No. 2013/0186549.

The nip roller 90 is an exemplary pressing element or elements, which is configured to rotate around a fixed axis with the movement of the belt 44. In particular, the nip roller 90 may roll against the rear surface 44*b* in the direction of arrow 112 while the belt 44 rotates in the feed direction 53. In some embodiments, the nip roller 90 includes a heating element 114 (e.g., an electric heater). The heating element 114 is configured to heat and maintain nip roller 90 at an elevated temperature that is greater than room temperature (25° C.), such as at a desired transfer temperature for the EP layers 22.

The layer heater 92 includes one or more heating devices (e.g., an infrared heater and/or a heated air jet) that are configured to heat the EP layers 22 on the belt 44 to a temperature at or above an intended transfer temperature of the EP layer 22, such as a fusion temperature of the part material 86*p* and/or the support material 86*s*, prior to reaching the nip roller 90. Each EP layer 22 desirably passes by (or through) the layer heater 92 for a sufficient residence time to heat the layer 22 to the intended transfer temperature. The top-of-part heater 94 may function in a similar manner as the layer heater 92, and heats the top surfaces of the structure 16 on the build platform 48 to an elevated temperature, such as at or above a fusion temperature (or other suitable elevated temperature) of the powder material.

If a part material is printed using a EP engine, the support material 86*s* of the present disclosure used to form the support layers or portions 22*s* preferably has a melt rheology that is similar to or substantially the same as the melt rheology of the part material 86*p* of the present disclosure used to form the part layers or portions 22*p* of the structure 16. This allows the part and support materials 86*p* and 86*s* of the layers 22*p* and 22*s* to be heated together to substantially the same transfer temperature, and also allows the part and support materials 86*p* and 86*s* at the top surfaces of the structure 16 to be heated together by top-of-part heater 94 to substantially the same temperature. Thus, the part layers 22*p* and the support layers 22*s* may be transfused together to the top surfaces of the structure 16 supported on the platform 48 in a single transfusion step as the combined EP layer 22 using the transfusion assembly 40. However, the part material 86*p* is optional and, therefore, support materials 86*s* of any suitable rheology is within the scope of the present disclosure. For example, multiple EP engines 32*s* that produce layers 22*s* formed of a single support material 86*s* may also be used.

The optional post-transfusion heater 96 may be located downstream from nip roller 90 relative to the feed direction 53, and is configured to heat the transfused layers 22 to an elevated temperature. Again, close melt rheologies of the part and support materials 86*p* and 86*s* will allow the post-transfusion heater 96 to post-heat the top surfaces of the structure 16, such as part portions 22*p* and support structure portions 22*s*, together in a single post-fuse step when part material 86*p* is utilized.

As mentioned above, in some embodiments, prior to building the combined structure 16 on the build platform 48, the build platform 48 and the nip roller 90 may be heated to desired temperatures. For example, the build platform 48 may be heated to the average part temperature of structure 16. In comparison, the nip roller 90 may be heated to a desired transfer temperature for the EP layers 22. During the printing or transferring operation, the belt 44 carries an EP layer 22 past the layer heater 92, which may heat the layer 22 and the associated region of the belt 44 to at or above the transfer temperature. Suitable transfer temperatures for the charged powder materials of the present disclosure include temperatures that exceed the glass transition temperature of these materials, where the layer 22 is softened but not melted.

As further shown in FIG. 4, during operation, the gantry 104 may move the build platform 48 with the current structure 16 in a reciprocating rectangular build pattern 86. In particular, the gantry 104 may move the build platform 48 along the x-axis below, along, or through the top-of-part heater 94. The heater 94 heats the intermediate top surfaces of the current structure 16 to an elevated temperature, such as at or above the transfer temperatures of the part and support materials 86*p* and 86*s*. The heaters 92 and 94 may heat the EP layers 22 and the top surfaces of the current structure 16 to about the same temperatures to provide a consistent transfusion interface temperature. Alternatively, the heaters 92 and 94 may heat layers 22 and the top surfaces of the part portions 22*p* and the support portions 22*s* to different temperatures to attain a desired transfusion interface temperature.

The continued rotation of the belt 44 and the movement of the build platform 48 align the heated EP layer 22 with the heated top surfaces of the structure 16 with proper registration along the x-axis. The gantry 104 may continue to move the build platform 48 along the x-axis, at a rate that is synchronized with the rotational rate of the belt 44 in the feed direction 53 (i.e., the same directions and speed). This causes the rear surface 44*b* of the belt 44 to rotate around the nip roller 90 to nip the belt 44 and the heated layer 22 against the top surfaces of structure 16. This presses the heated layer 22 between the heated top surfaces of the structure 16 at the location of the nip roller 90, which at least partially transfuses the heated layer 22 to the top layers of the structure 16.

As the transfused layer 22 passes the nip of the nip roller 90, the belt 44 wraps around the nip roller 90 to separate and disengage from the build platform 48. This assists in releasing the transfused layer 22 from the belt 44, allowing the transfused layer 22 to remain adhered to the structure 16. Maintaining the transfusion interface temperature at a transfer temperature that is higher than its glass transition temperature, but lower than its fusion temperature, allows the heated layer 22 to be hot enough to adhere to the structure 16, while also being cool enough to readily release from the belt 44. In alternative embodiments, nip roller 90 may be replace with multiple nip rollers (e.g., a pair of nip rollers), or by a press plate, such as are disclosed in Chillscyzn et al. U.S. Pat. No. 8,718,522. In other alternative embodiments, as mentioned above, the transfer assembly 34 may be eliminated, and the belt 44 and nip roller 90 replaced with a transfer drum or other transfer medium configured to receive imaged layers from the EP engines 32, such as is disclosed in Hanson et al., U.S. Pat. No. 8,879,957. In such embodiments, the imaged layers may be heated while on the transfer drum.

After release from the belt 44 or other transfer medium, in some embodiments, the gantry 104 continues to move the build platform 48 along the x-axis to the post-transfusion heater 96. At post-transfusion heater 96, the top-most layers 22 of the structure 16 may be heated to at least the fusion temperature of the thermoplastic-based powder in a post-fuse or heat-setting step. This melts the material of the transfused EP layer 22 to a highly fusable state such that polymer molecules of the transfused layer 22 quickly inter-diffuse to achieve a high level of interfacial entanglement with the support structure 16.

In some embodiments, the transfusion assembly 40 includes a cooling device, shown as chiller 116, configured to cool the top layers 22 of the structure 16 on the platform 48, such as using air jets, as the gantry 104 moves the build platform 48 along the build path 106. To assist in keeping the structure 16 at the average part temperature, in some preferred embodiments, the heater 94 and/or the heater 96 may be configured to heat only the top-most layers of structure 16. For example, in embodiments in which heaters 92, 94, and 96 are configured to emit infrared radiation, the part and support materials 86*p* and 86*s* may include heat absorbers and/or other colorants configured to restrict penetration of the infrared wavelengths to within only the top-most layers. Alternatively, the heaters 92, 94, and/or 96 may be configured to blow heated air across the top surfaces of the structure 16. In either case, limiting the thermal penetration into the structure 16 allows the top-most layers to be sufficiently transfused, while also reducing the amount of cooling required to keep the structure 16 at the desired average part temperature.

After the transfusion of the EP layer 22 to the structure 16 supported on the build platform 48, the gantry 104 may move the build platform and the supported structure 16 to the deposition unit 14. The deposition unit 14 then performs a molding process to form a molded part portion 22*mp* within the one or more cavities 18 of the layer 22, as illustrated in FIG. 1. Alternatively, the molding process is performed after the transfusion of two or more of the layers 22 to the current structure 16 supported on the build platform 48.

In some embodiments, the build path 106 includes a bypass portion 106*a* that bypasses the build path portion 106*b*, along which the deposition unit 14 is positioned, as illustrated in FIGS. 1 and 4. In some embodiments, when multiple EP layers 22 are to be transfused to the structure 16 before performing the molding process using the deposition unit 14, following the transfusion of an EP layer 22 to the structure 16, the gantry 104 moves the build platform 48 and the supported structure 16 along the bypass portion 106*a* (which may include the chiller 116) back to the transfusion assembly 40. After registering the build platform 48 or the structure 16 with the transfusion assembly 40, which may require lowering the build platform 48 using the gantry 104, another layer 22 is transfused to the structure 16 in accordance with embodiments described above. This process can be repeated as necessary until the structure 16 is ready for the molding process. The gantry 104 then moves the build platform 48 along the build path portion 106*b* and a molding process is performed using the deposition unit 14 to form a multilayer molded part portion 22*mp* within the one or more cavities 18 of the structure 16, in accordance with one or more embodiments described herein.

In some embodiments, the system 10 allows at least the top portion of the structure 16 to be cooled before performing a molding process using the deposition unit 14. In some embodiments, following the transfusion process performed by the EP unit 12, the gantry 104 moves the build platform 48 with the supported structure 16 along the build path 106, such as along the build path portion 106*b*, to the chiller 116, which is illustrated schematically in FIGS. 1 and 4. The chiller 116 operates to cool at least a top portion of the structure 16 supported on the build platform 48 before commencing the molding process using the deposition unit 14. The chiller 116 cools the structure 16 to sufficiently solidify at least the portions of the structure 16 forming the cavity or part mold 18 that is to be used by the deposition unit 14 during the molding process stage of the formation of the molded part. Exemplary embodiments of the chiller 116 include a blower configured to produce air jets that blow over the top surface of the structure 16, and/or other suitable cooling devices. After sufficiently cooling the structure 16, the gantry 104 delivers the build platform 48 and the supported structure 16 along the build path 106*b* and registers the build platform 48 and/or structure 16 with the deposition unit 14 to allow for the commencement of a molding process using the deposition unit 14.

Figure 5:
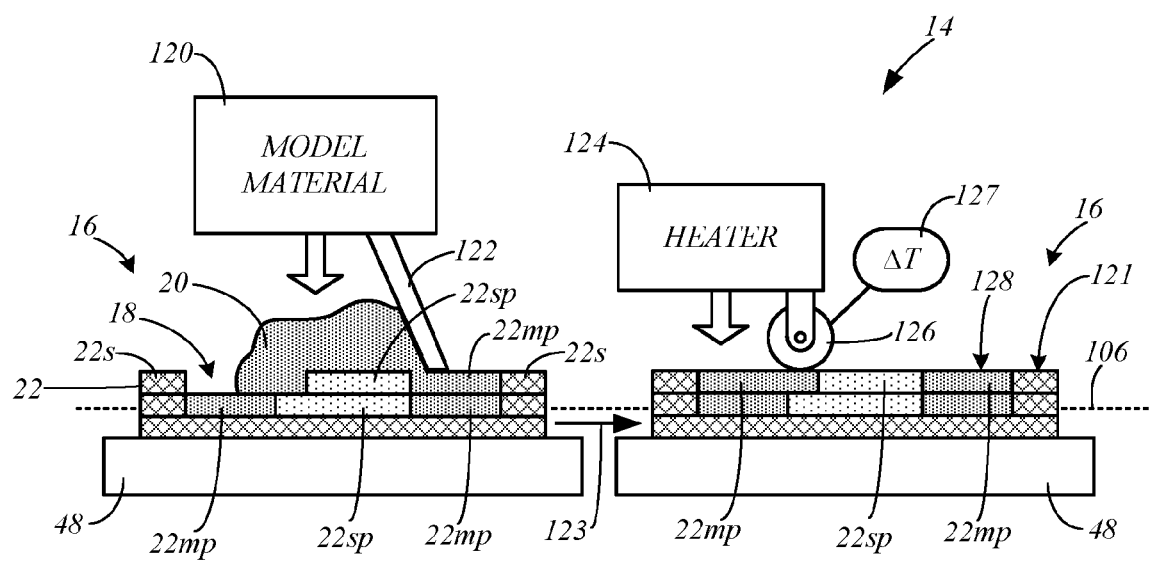
FIG. 5 is a simplified diagram of a deposition unit and exemplary method steps of a part molding process in accordance with embodiments of the present disclosure.

Exemplary embodiments of the deposition unit 14 are illustrated in the simplified diagram of FIG. 5. FIG. 5 also illustrates the deposition unit 14 performing exemplary molding processes. While FIG. 5 illustrates a molding process being performed using a cavity or part mold 18 that is generally formed by a single EP layer 22 of the structure 16, alternative embodiments cover molding processes in which the cavity or part mold 18 is defined by multiple layers 22 of the structure 16, as mentioned above.

The molding process performed using the deposition unit 14 allows the system 10 to produce a multi-material 3D part having one or more molded part portions 22*mp* comprising molding materials 20 and one or more printed part portions 22*p* comprising powder material, which may take on many different forms. In some embodiments, the molding material 20 comprises a material that is not conventionally used in electrophotographic part producing processes, such as, for example, materials comprising electrically conductive particles such as metal, ceramic particles, large particles, or particles having a wide charge distribution. This can allow for the use of materials that are not printable by the EP engines 32 and/or without the additional cost to develop and manufacture the materials into a toner or powder that may be used with the EP engines 12. In some embodiments, the molding material 20 has a melt rheology that is similar to or substantially the same as the melt rheology of the part material 86*p* and/or the support material 86*s* of the electrophotographically formed layers 22 of the structure 16.

Optionally, the combined electrophotographic and molding processes performed by the system 10 allow for the formation of unique, composite 3D parts. For example, when the illustrated portions 22*sp* of the structure 16 in FIG. 5 includes the part portions 22*p* formed using the EP unit 12, the final 3D part produced by the system 10 includes both the part portions 22*p* and the molded part portions 22*mp*. This allows the final produced 3D part to include part portions 22*p* that protrude from the molded part, surround the molded part, and/or are enclosed within the molded part, for example. Typically, the part portions 22*p* would be formed from a different material type than is used to form part portions 22*mp*, creating a two material part. Other configurations of the part portions 22*p* and the molded part may also be achieved using the system 10. For example, more than two part materials may be used. When the structure 16 is only formed of the support structure portions 22*s*, the molded part forms the entire 3D part being produced.

In some embodiments, the deposition unit 14 includes a molding material dispenser 120, which is configured to dispense the molding material 20 over a top surface 121 of the structure 16 and into the one or more cavities 18 of the structure 16 using any suitable technique, as illustrated in FIG. 5. The dispenser 120 may comprise conventional components that are suitable for dispensing the molding material 20. In some embodiments, the molding material 20 is in a powdered or granular form. In some embodiments, the molding material 20 is in a molten form. In accordance with this embodiment, the molding material dispenser 120 may include one or more heaters to maintain the molding material 20 in the molten form, or to transition the molding material 20, either partially or completely, from a solid form (e.g., granular or powder) to the molten form.

In some embodiments, the deposition unit 14 includes a spreading device 122 that operates to spread the molding material 20 over the top surface 121 of the structure 16 and into the one or more cavities 18, as illustrated in FIG. 5. Exemplary embodiments of the spreading device 122 include a blade (shown) that extends across a width of the structure 16 that is transverse to the direction 123 in which the gantry 104 feeds the build platform 48 along the build path 106, or other suitable spreading device.

In some embodiments, the deposition unit 14 includes a heater 124 that is configured to heat the molding material 20 within the one or more cavities 18 of the structure 16, as the build platform 48 and the supported structure 16 are fed along the build path 106 by the gantry 104. In some embodiments, the heater 124 includes a resistive heating element, a radiant heater, an infrared radiation heater, a hot air blower, and/or another suitable heating device.

In some embodiments, when the molding material 20 is in a powdered or granular form, the heater 124 is configured to at least melt a portion of the molding material 20 within the one or more cavities 18. In some embodiments, the heater 124 is configured to fuse the powdered or granular molding material 20 to itself. In some embodiments, the heater 124 is configured to heat the molding material within the one or more cavities 18 such that it transfuses to the surfaces of the layer or layers 22 that define the one or more cavities 18. In some embodiments, the heater 124 is configured to heat the powdered or granular molding material 20 to soften the powdered or granular molding material 20 and prepare the molding material 20 for a sintering process.

In some embodiments, the deposition unit 14 includes a pressing device 126 that is configured to engage the top surface 128 of the molding material 20 within the one or more cavities 18, and press the molding material 20 into the one or more cavities 18, as illustrated in FIG. 5. In some embodiments, the pressing device 126 is configured to sinter the molding material, or a portion of the molding material, into the one or more cavities 18 while the molding material 20 is in a softened or partially melted state. In some embodiments, the pressing device 126 includes a roller that is configured to roll over the top surface 128, as shown in FIG. 5. Other exemplary embodiments of the pressing device 126 include a blade (not shown) that is configured to slide over the top surface 128 of the molding material 20, or other suitable pressing device. In some embodiments, the functions of the spreader 122 and the pressing device 126 may be combined into a single roller, blade, or other suitable component, to both spread and press the molding material 20 into the cavities 18. In some embodiments, the pressing device 126 includes a heating element 127 that is configured to maintain the pressing device 126 at an elevated temperature that is greater than room temperature (25° C.), such as at a desired temperature for sintering the molding material 20.

In some embodiments, the pressing device 126 is located downstream of the heater 124 relative to the feed direction 123, as shown in FIG. 5. Alternatively, the pressing device 126 may be located upstream of the heater 124 (if present) relative to the feed direction 123.

In some embodiments, the nip roller 90 (FIG. 4) of the transfusion assembly 40, with or without the top-of-part heater 94, is used to perform the functions of heating the molding material 20, and pressing the molding material 20 into the one or more cavities 18 of the structure 16. Accordingly, the heater 124 and the pressing device 126 of the deposition unit may be eliminated. In some embodiments, following the deposition of the molding material 20 into the cavities 18 of the structure 16, the build platform 48 is moved along the build path 106 to the nip roller 90, and the nip roller 90 presses the molding material 20 into the cavities 18. In some embodiments, the belt 44 at the nip roller 90 is free from layers 20 during this pressing process. Additionally, in some embodiments, the nip roller 90 may apply heat to the molding material 20 as it presses the molding material 20 into the cavities. In some embodiments, the top-of-part heater 94 is used to apply heat to the molding material 20 before it is pressed into the cavities 18 by the nip roller 90.

In some embodiments, the system 10 includes a chiller 130 located downstream of the deposition unit 14 relative to the feed direction 123, as shown in FIG. 1. The chiller 130 operates to cool the molding material 20 within the cavities 18 and at least the top sections of the structure 16. In some embodiments, the chiller 130 cools these components to the average temperature for the structure 16 that is desired for performing the transfusion operation using the transfusion assembly 40. The chiller 130 may take on any suitable form, such as that described above with regard to chiller 116.

In some embodiments, the system 10 includes a planarization device 132 that is located downstream of the deposition unit 14 relative to the feed direction 123 (FIG. 1). In some embodiments, the planarization device 132 is configured to planarize the top surface 128 of the molding material 20 within the cavities 18. In some embodiments, the planarization device 132 is configured to planarize the top surface 121 of the structure 16, which removes molding material 20 from the top surface 121 of the structure 16, such as part portions 22$p$ and support portions 22$s$. Embodiments of the planarization device 132 include a grinder, a blade, or other conventional planarizing devices. In some embodiments, the planarization operation performed by the planarization device 132 ensures that the top surfaces 121 and/or 128 of the structure 16 and the molding material 20 are substantially flat and are prepared to receive additional EP layers 22 or molding material 20 in subsequent transfusion and molding processes.

After the molding process is completed using the deposition unit 14, the one or more EP layers 22 of the structure 16 include only structure portions 22$s$, or structure portions 22$s$ and one or more molded part portions 22$mp$, as indicated by portions 22$sp$ in FIG. 5. The gantry 104 moves the build platform 48 and the supported structure 16 with the molded part portions 22$mp$ along the build path 106 back to the transfusion assembly 40 to begin another round of the transfusion and molding processes as necessary to form a completed structure 16 that includes the molded part formed of the molded part portions 22$mp$ and the structure portions 22$s$, with the option of also including part portions 22$p$. As discussed below, the structure portions 22$s$ may be removed to reveal the final 3D part.

Figure 12:
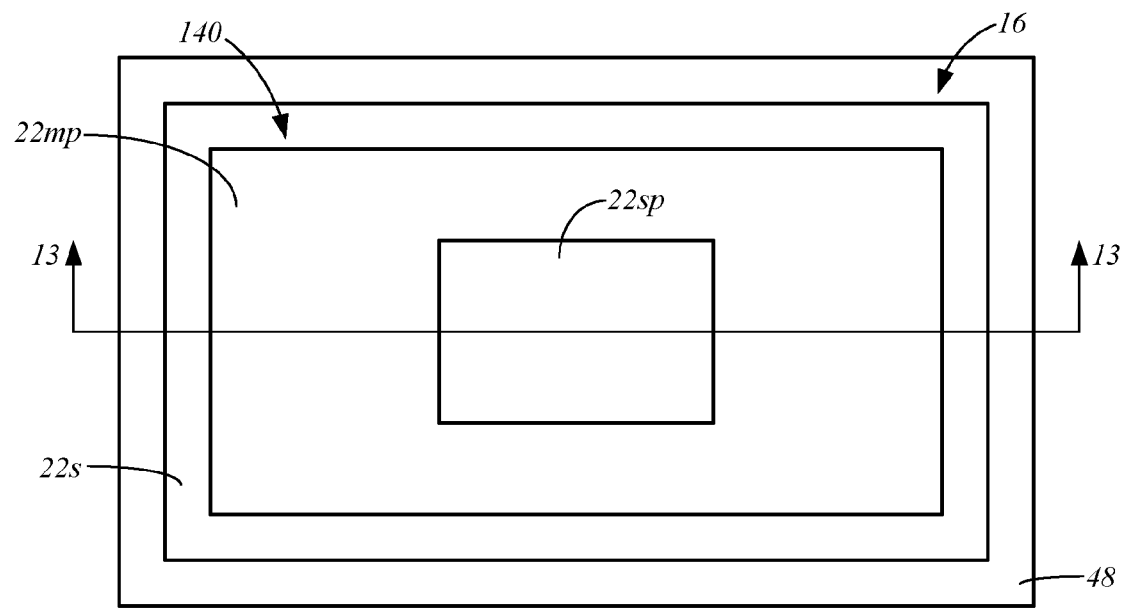
FIG. 12 is a simplified top view of an exemplary structure supported on a build platform after completing multiple transfusion processes and one or more molding processes, in accordance with embodiments of the present disclosure.
Figure 13:
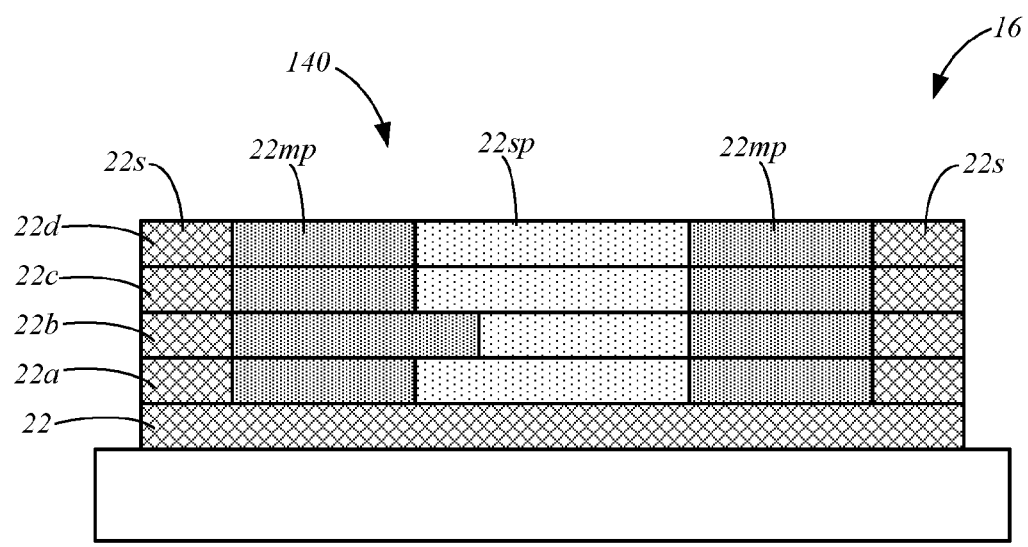
FIG. 13 is a simplified cross-sectional view of the exemplary structure taken generally along lines 13-13 of FIG. 12.

Exemplary embodiments of a method of producing a 3D part using embodiments of the additive manufacturing system 10 will be described with reference to FIGS. 6-13. FIGS. 6-11 are simplified side cross-sectional views of a structure 16 at various stages of the method. FIG. 12 is an exemplary completed structure 16 comprising a 3D part 140, and FIG. 13 is a side cross-sectional view of the structure 16 of FIG. 12, taken generally along line 13-13. As discussed above, the portions 22sp are used to illustrate embodiments in which the structure 16 includes only support portions 22s, or both support portions 22s and part portions 22p.

Figure 6:
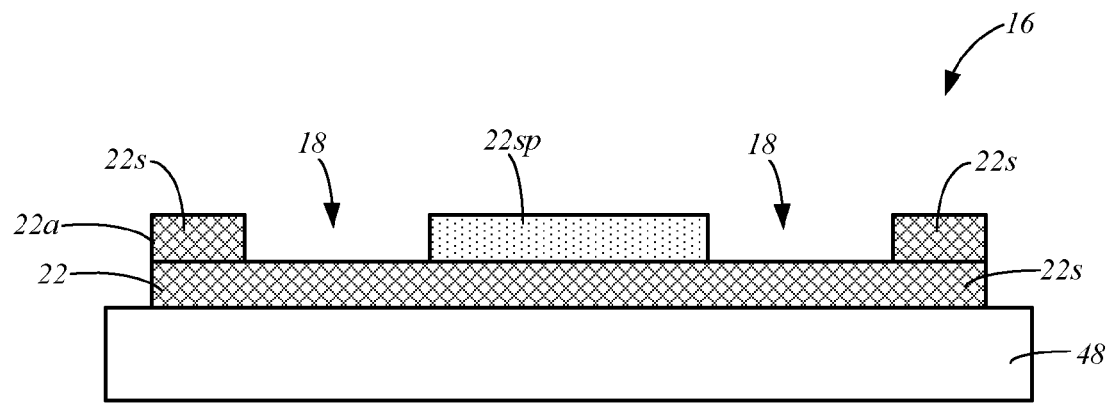
FIGS. 6-11, which are simplified side cross-sectional views of a combined structure 16 at various stages of production.

In some embodiments of the method, a structure 16 having at least one cavity 18, such as that illustrated in FIG. 6, is built on the build platform 48 in a layer-by-layer manner using the EP unit 12 in accordance with one or more embodiments describe above. For example, a top layer 22a of the exemplary structure 16 includes a structure portion 22s, and at least one portion 22sp that may be a structure portion 22s or a part portion 22p. In some embodiments, the portions 22s and 22p are developed using the EP engines 32s and 32p, as discussed above with reference to FIGS. 1-3. The layer 22a is then transferred to the transfer medium 44, which feeds the transfer layer 22a to the transfusion assembly 40. The transfusion assembly transfuses the layer 22a to, for example, a bottom layer 22 of the structure 16, to form the structure 16 shown in FIG. 6.

In some embodiments of the method, the structure 16 is cooled on the build platform 48 using the chiller 116, exemplary embodiments of which are shown in FIGS. 1 and 4. As mentioned above, this cools the structure 16 in preparation for the molding process.

Figure 7:
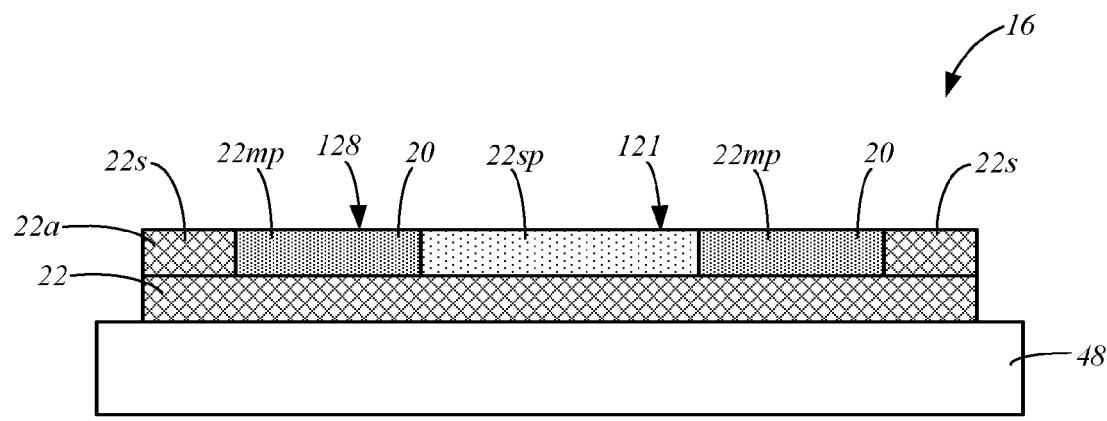
Figure 8:
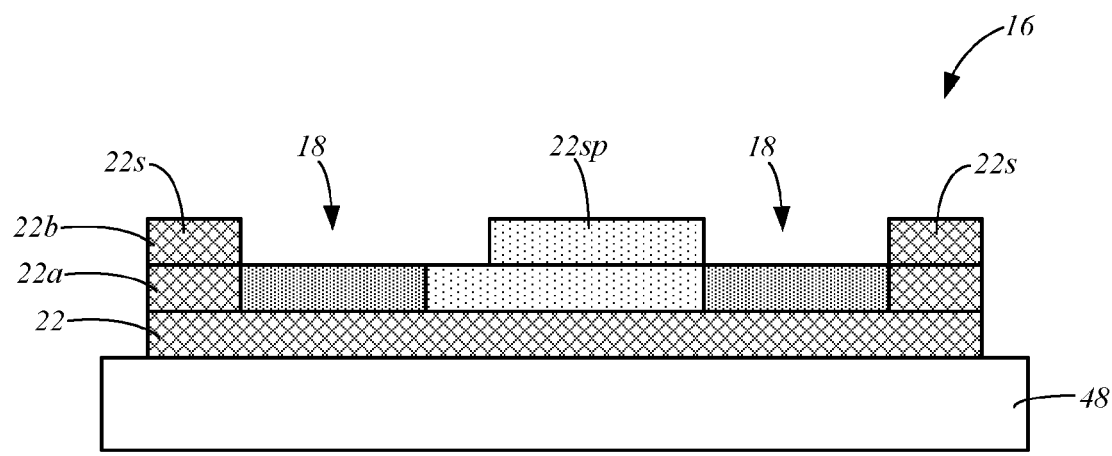
Figure 9:
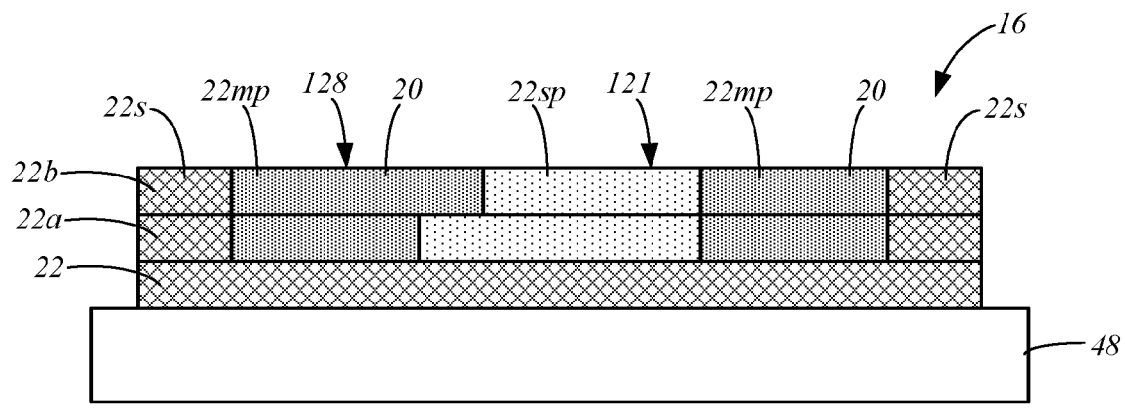
Figure 10:
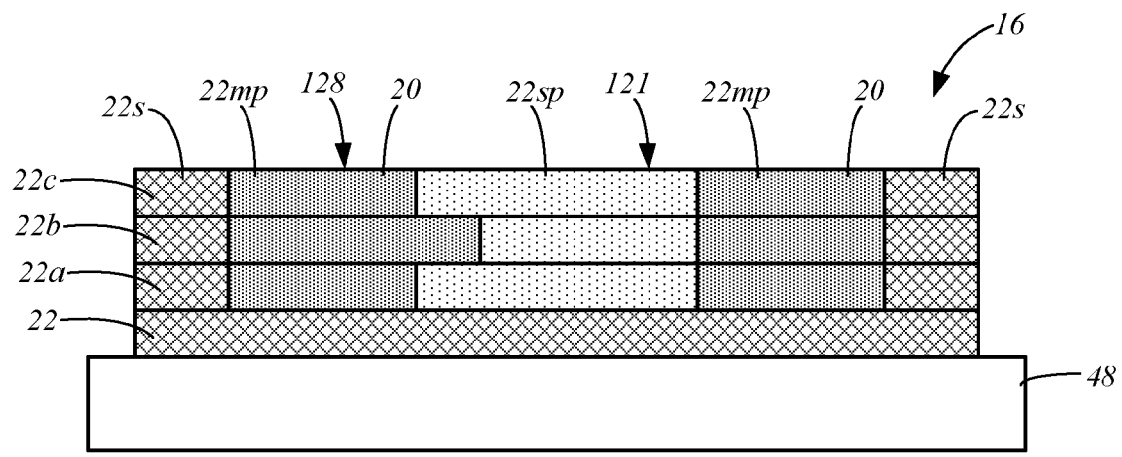
Figure 11:
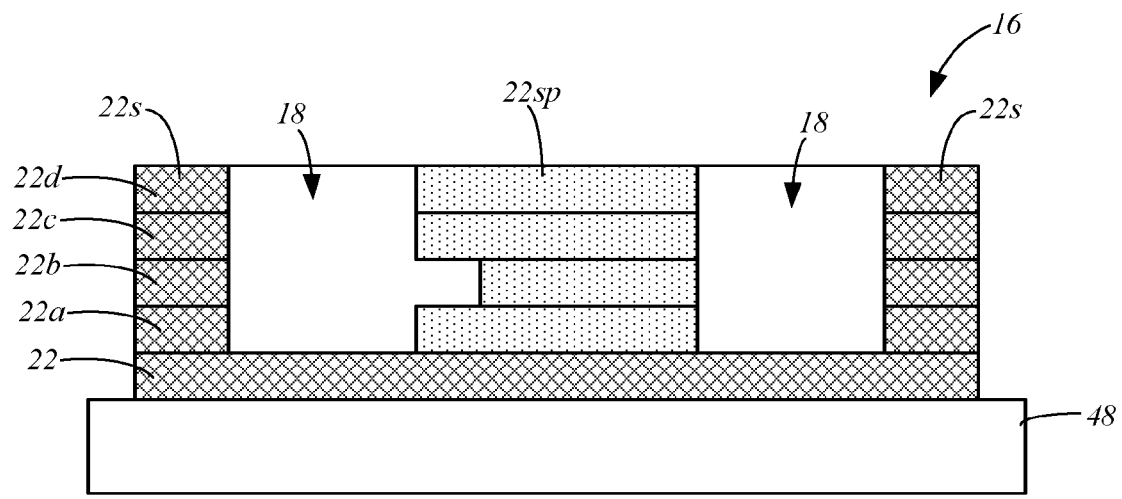

In some embodiments of the method, the molding process is performed on the structure 16 using the deposition unit 14 in accordance with one or more embodiments described above. For example, molding material 20 is deposited into the one or more cavities 18 of the layer 22a using the dispenser 120, as shown in FIG. 5, to form the molded part portion 22mp of the structure 16, as shown in FIG. 7. In some embodiments, the molding material 20 is spread over a top surface 121 of the structure 16 and into the one or more cavities 18 using the spreader 122 (FIG. 5).

In some embodiments, the molding material 20 is deposited into the one or more cavities 18 when the molding material 20 is in a powdered or granular state. In some embodiments, the step of forming the molded part portion 22mp within the one or more cavities 18 involves heating the molding material 20 within the cavity, such as using the heater 124 shown in FIG. 5. In some embodiments, this heating of the molding material 20 causes the molding material 20 to soften, melt, or fuse together. In some embodiments, only a portion of the molding material 20 in the cavities 18, such as a top surface or top portion, is softened, melted, or fused together, while the remaining portion remains in its deposited condition or different condition.

In some embodiments, the molding material 20 is deposited into the one or more cavities 18 of the structure 16 when in a molten state. In accordance with this embodiment, it may not be necessary to further heat the molten molding material 20, such as by using heater 124.

In some embodiments, the molding material 20 within the one or more cavities 18 is pressed into the one or more cavities 18 by a pressing device 126 (FIG. 5). In some embodiments, this operates to sinter the molding material 20 within the one or more cavities 18. In some embodiments, when only the top surface or top portion of the molding material 20 within the cavities 18 is softened, melted or fused together, this pressing step causes the top portion of the molding material 20 to be sintered into the cavities 18.

A post-production process may later be formed on the molded part portions of the 3D part, such as the application of heat and pressure to finalize the 3D part. For example, a molded part portion 22mp may be partially fused at moderate temperatures and intermediate pressures as the 3D part is formed, then a final fuse may be performed when the part is fully assembled at higher temperature and pressure.

In some embodiments, the molding material 20 within the one or more cavities 18 is cooled to solidify the molding material 20 and/or return the structure 16 to a desired temperature, such as a desired temperature for performing a transfusion process using the transfusion assembly 40, for example. In some embodiments, this cooling step may be performed by a chiller 130 shown in FIG. 1, for example.

In some embodiments, a top surface 128 of the molding material 20 in the one or more cavities 18 is planarized using the planarization device 132. This ensures a uniform top surface 128 of the molding material 20, and can also remove molding material 20 from the top surfaces 121 of the layer 22a.

In some embodiments, the 3D part 140 is produced by adding one or more EP layers 22 to the current structure 16 (FIG. 7) using the EP unit 12, and forming another molded part portion 22mp within the one or more cavities 18 of each of the layers 22 using the deposition unit 14. For example, a layer 22b may be transfused to the top surface of the layer 22a using the EP unit 12 to form the exemplary structure 16 shown in FIG. 8. Molded part portions 22mp may then be formed within the one or more cavities 18 of the layer 22b using the deposition unit 14 to form the structure 16 illustrated in FIG. 9. Subsequently, a layer 22c may be transfused to the top of the layer 22b by the EP unit 12, and molded portions 22mp may be formed within the one or more cavities 18 of the layer 22c by performing embodiments of the molding process using the deposition unit 14, resulting in a structure 16 shown in FIG. 10. The completed structure 16 may then be formed by transfusing a layer 22d on the top surface of the layer 22c using the EP unit 12, and molded portions 22mp may be formed within the one or more cavities 18 of the layer 22d by performing embodiments of the molding process using the deposition unit 14, resulting in the structure 16 shown in FIGS. 12 and 13.

One alternative to this process of transfusing the layers 22 and forming the molded part portions 22mp in a layer-by-layer manner, involves building a structure 16 having multiple layers 22 defining the one or more cavities 18, and molding the part portions 22mp within the one or more cavities using the deposition unit 14. For example, the structure 16 illustrated in FIG. 11 may first be formed using the EP unit 12 by developing and transfusing the layers 22a-22d in a layer-by-layer manner. In some embodiments, this involves feeding the build structure 48 along a bypass route 106a (FIGS. 1 and 4), as discussed above. After the multi-layered structure 16 is formed, molded portions 22mp may be formed in the cavities 18 in accordance with embodiments of the molding process described above. This generally involves moving the structure 16 to the deposition unit 14 using the gantry 104, such as along the build path 106b, depositing the molding material 20 into the one or more cavities 18, and possibly performing other method steps, such as, for example, spreading the molding material 20 using the spreader 122, heating the molding material 20 using the heater 124, pressing the molding material 20 within the cavities 18 using the pressing device 126, cooling the molding material 20 within the cavities 18 using the chiller 130, and/or planarizing the top surface 128 of the molding material 20 using the planarization device 132, to form the structure shown in FIGS. 12 and 13.

After the structure 16 with the molded part portions 22*mp* is completed, such as illustrated by the exemplary structure 16 of FIGS. 12 and 13, the structure 16 may be removed from the system 10 and undergo one or more operations to reveal the completed 3D part 140 formed by the molded part portions 22*mp* and, optionally, the part portions 22*p*. For example, the support portions 22*s* may be sacrificially removed from the 3D part 140 using an aqueous-based solution such as an aqueous alkali solution. Under this technique, the support portions 22*s* may at least partially dissolve in the solution separating the support portions 22*s* from the 3D part in a hands-free manner.

In comparison, the molded part portions 22*mp* and the part portions 22*p* are chemically resistant to aqueous alkali solutions. This allows the use of an aqueous alkali solution for removing the sacrificial support portions 22*s* without degrading the shape or quality of the 3D part 140.

Furthermore, after the support portions 22*p* are removed, the 3D part 140 may undergo one or more additional processes, such as surface treatment processes, a curing application such as one using ultraviolet light or heat, a sintering operation, or other process.

Although the present disclosure has been described with reference to preferred embodiments, workers skilled in the art will recognize that changes may be made in form and detail without departing from the spirit and scope of the disclosure.

What is claimed is:

1. A method of producing a 3D part using an additive manufacturing system comprising steps of:
    forming a plurality of layers of powdered material using at least one electrophotographic (EP) engine;
    moving the plurality of layers to a transfusion assembly;
    transfusing the plurality of layers onto a build platform or a previously transfused layer utilizing heat and pressure over time at the transfusion assembly to fuse the powder material together within the layers and to the other layers to form a layered structure having at least one cavity wherein the at least one cavity defines at least a portion of the 3D part;
    cooling the layered structure on the build platform;
    molding the at least the portion of the 3D part within the at least one cavity of the cooled layered structure by depositing a molding material into the at least one cavity using a deposition unit; and
    alternating a printing step comprising the forming, moving, transfusing and cooling steps and the molding step multiple times to form the 3D part.

2. The method according to claim 1, wherein the layered structure comprises a sacrificial support material.

3. The method according to claim 1, wherein the layered structure comprises a sacrificial support material and a part material.

4. The method according to claim 1, wherein:
    depositing the molding material into the cavity comprises depositing the molding material into the cavity when the molding material is in a powdered state; and
    molding the at least the portion of the 3D part within the cavity comprises heating the molding material within the cavity to fuse together the molding material.

5. The method according to claim 4, wherein molding the at least the portion of the 3D part within the cavity further comprises pressing the molding material into the cavity.

6. The method according to claim 1, wherein depositing the molding material into the cavity comprises depositing the molding material into the cavity when the molding material is in a molten state.

7. The method according to claim 6, wherein forming the at least the portion of the 3D part portion further comprises cooling the molding material within the cavity.

8. The method according to claim 1, wherein forming the at least the portion of the 3D part comprises planarizing a top surface of the molding material within the cavity.

9. A method of producing a multi-material 3D part using an additive manufacturing system comprising steps of:
    printing a structure having one or more layers on a build platform comprising:
        forming the one or more layers of powder material using two or more electrophotographic (EP) engines;
        transferring the one or more layers to a transfer medium; and
        sequentially transfusing each of the one or more layers on the transfer medium onto the build platform using heat and pressure over time to form a layered structure having one or more cavities;
        cooling the layered structure on the build platform;
        wherein the layered structure includes a sacrificial material portion and a part portion; and
    forming a molded part portion within the one or more cavities by depositing molding material into the one or more cavities of the cooled layered structure using a deposition unit; and
    repeating the printing and forming steps multiple times to form a combined structure comprising a 3D part and a sacrificial support structure, wherein the 3D part includes the part portion of the layered structure and the molded part portion.

10. The method according to claim 9, wherein:
    depositing the molding material into the one or more cavities comprises depositing the molding material into the one or more cavities when the molding material is in a powdered state; and
    forming a molded part portion within the one or more cavities comprises heating the molding material within the one or more cavities to fuse together the molding material.

11. The method according to claim 9, wherein forming a molded part portion comprises at least one of heating the molding material and pressing the molding material into the cavity.

* * * * *